(12) United States Patent
Stenmark et al.

(10) Patent No.: US 8,390,569 B2
(45) Date of Patent: Mar. 5, 2013

(54) OPTICAL TRACKPAD MODULE AND METHOD OF USING SAME

(75) Inventors: Fredrik Martin Stenmark, Kitchener (CA); Kuo-Feng Tong, Etobicoke (CA)

(73) Assignee: Research In Motion Limited, Waterloo (CA)

( * ) Notice: Subject to any disclaimer, the term of this patent is extended or adjusted under 35 U.S.C. 154(b) by 547 days.

(21) Appl. No.: 12/626,308

(22) Filed: Nov. 25, 2009

(65) Prior Publication Data
US 2011/0122061 A1 May 26, 2011

(51) Int. Cl.
*G06F 3/033* (2006.01)
(52) U.S. Cl. .......................................... 345/157; 345/175
(58) Field of Classification Search ........................ None
See application file for complete search history.

(56) References Cited

U.S. PATENT DOCUMENTS

| | | | |
|---|---|---|---|
| 5,644,337 A | 7/1997 | Stacy | |
| 5,801,681 A * | 9/1998 | Sayag | 345/157 |
| 6,320,177 B1 | 11/2001 | Sayag | |
| 6,974,947 B2 * | 12/2005 | Black et al. | 250/221 |
| 7,545,362 B2 | 6/2009 | Kong | |
| 7,719,524 B2 * | 5/2010 | Hoshino et al. | 345/175 |
| 8,106,885 B2 * | 1/2012 | Lowles et al. | 345/166 |
| 2007/0132733 A1 | 6/2007 | Ram | |
| 2008/0010616 A1 | 1/2008 | Algreatly | |
| 2009/0207130 A1 * | 8/2009 | Chen et al. | 345/156 |

FOREIGN PATENT DOCUMENTS

| | | | |
|---|---|---|---|
| EP | 2068235 A2 | 6/2009 | |
| JP | 09237158 A | 9/1997 | |
| WO | 0184482 A2 | 11/2001 | |

OTHER PUBLICATIONS

Dominik Ströhlein: "Bewegungsanalyse auf Basis von Blockvergleichsverfahren zur MPEG-7 Visual-Descriptor Extraktion"; XP002580583; Retrieved from the Internet: URL:http://www.informatik.uni-bremen.de/klavid/wiki/uploads/Internes/Blockmatching%20Dominik%20Stroehlein%20050216.pdf> Mar. 10, 2005, retrieved on Mar. 4, 2010.
Extended European Search Report; EP09177113.9; May 11, 2010.
Simon Ng, How to Control iPod Music Playback Anytime on iPhone, Simonblog—http://www.simonblog.com/2009/01/07/how-to-control-ipod-music-playback-anytime-on-iphone/, Jan. 7, 2009, pp. 1-9.
Apple website (www.Apple.com), iPod Classic features, Jun. 27, 2009, pp.—1-15. IndustrialComponent.com website (www.industrialcomponent.com/usbstuff/cst2545wrc.html), USB Mice and Trackballs, Apr. 2009, pp.—1-5.
Myung-Soo KM et al., A Physical 3D Trackball, Proceedings Ninth Pacific Conference on Computer Graphics and Applications, Oct. 16, 2001 to Oct. 18, 2001, pp. 134-138, Tokyo, Japan.
Dan Frakes—Kensington SlimBlade Trackball Switchable Modes Put a New Twist on an Old Device, Mackworld.com, May 1, 2009, pp. 1-3.

* cited by examiner

*Primary Examiner* — Jason Olson
(74) *Attorney, Agent, or Firm* — Novak Druce Connolly Bove + Quigg LLP

(57) ABSTRACT

An optical trackpad module is described herein. The module includes a light source and a trackpad that is optically coupled to the light source such that light from the light source can reach the trackpad. The trackpad is configured to receive an input object. The module also includes a sensor array that receives at least some of the light from the light source that is reflected off the input object. The sensor array is divided into sub-sections, and each sub-section corresponds to a portion of the trackpad. In addition, each sub-section detects at least translational movement of the input object on the corresponding trackpad portions to enable detection of rotational motion of the input object on the trackpad.

19 Claims, 7 Drawing Sheets

OPTICAL TRACKPAD MODULE AND METHOD OF USING SAME

FIELD OF TECHNOLOGY

The subject matter herein generally relates to optical trackpads and in particular, to detecting rotational movements on such trackpads.

BACKGROUND

Manufacturers have recently expressed an interest in optical trackballs. An optical trackball typically includes an optical trackpad that is positioned on the front surface of a handset, just below the display. An infrared light source located below the trackpad emits infrared light towards the trackpad, and when a user places his finger on the trackpad, a sensor detects this event. The sensor detects the user's finger by receiving infrared light that has been reflected off the user's finger. The handset also determines the direction of motion of the user's finger on the trackpad, and this action is translated into corresponding functions associated with the handset.

Today's trackpads present several advantages over mechanical trackballs: they do not protrude from the front surface of the handset and they are hardier components because of their lack of moving parts. Nonetheless, current trackpads are typically unable to detect rotational movement of a user's finger. If a user rotates his finger on such a trackpad, the handset typically mistakenly interprets this motion as distinct vertical and horizontal movements.

Another disadvantage with today's handsets—no matter whether they rely on mechanical or optical trackballs—is the number of buttons or keys that are positioned on them, particularly on the edges or perimeter of the housing of the mobile phone. As a result, a user may become overwhelmed with all the various ways to control the features associated with his mobile phone.

BRIEF DESCRIPTION OF THE DRAWINGS

Embodiments of the present application will now be described, by way of example only, with reference to the attached Figures, wherein.

DETAILED DESCRIPTION

Figure 1:
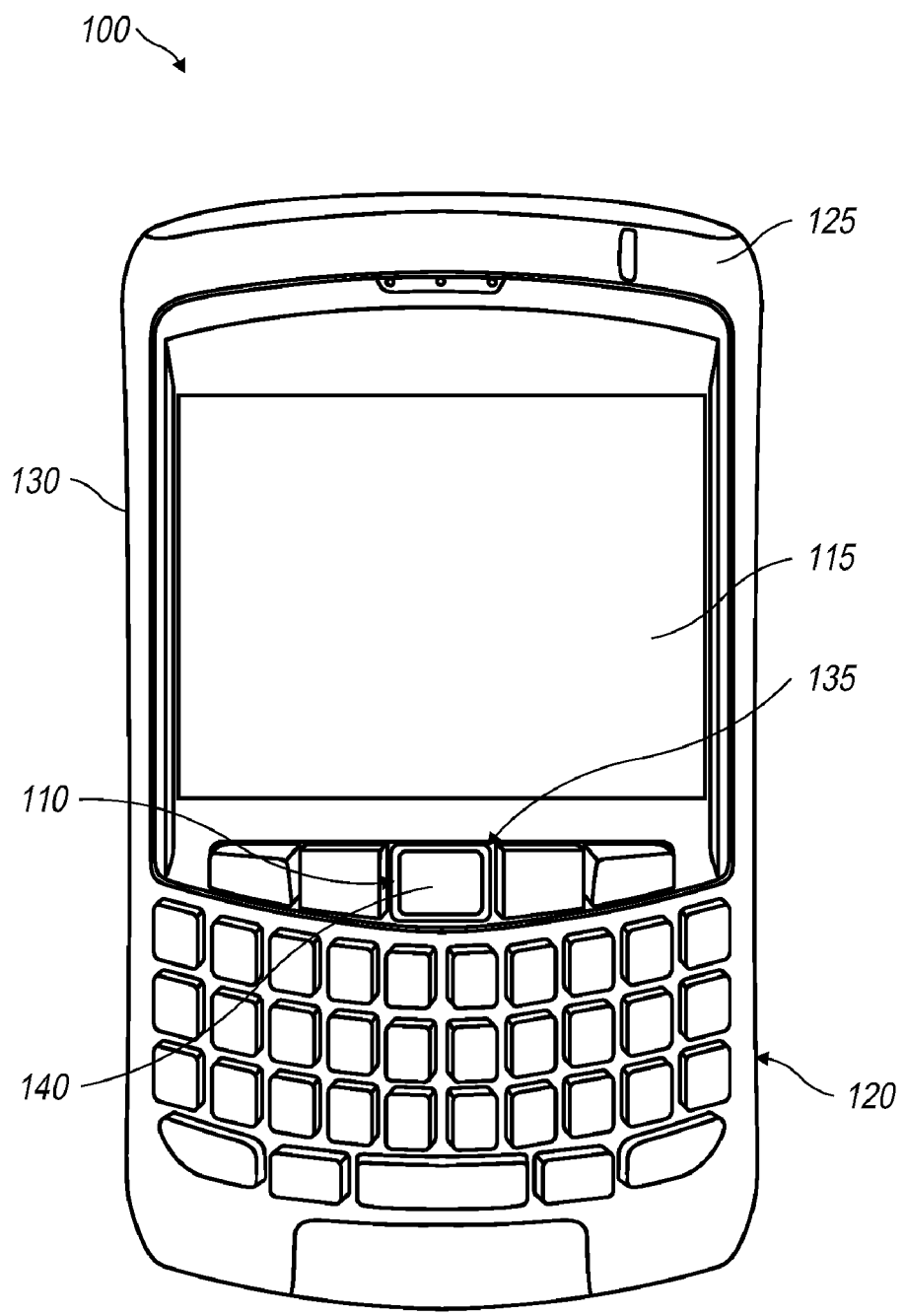
FIG. 1 illustrates an example of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The word "coupled" is defined as connected, whether directly or indirectly through intervening components and is not necessarily limited to physical connections. The term "mobile device" is defined as any electronic device that is capable of at least accepting information entries from a user and includes its own power source. A "light source" is defined as any element capable of emitting light, which includes visible light, non-visible light or both. The terms "visible spectrum" or "visible light" means light that has a frequency of approximately 380 nanometers (nm) up to about 750 nm. Consequently, the terms "non-visible spectrum" or "non-visible light" mean light that is outside the visible spectrum, as defined above. An "input object" is defined as any element or group of elements that is capable of movement and that can generate a corresponding action in a user interface element.

The terms "processor" and "processing unit" are defined as a component or a group of components that are capable of receiving input signals associated with movement at or on a trackpad, processing those signals and selectively signaling other components to respond to such movements. A "sensor array" is defined as a collection of sensors that are capable of detecting reflected light signals and in response, generating corresponding electrical signals. A "trackpad" is defined as a unit that provides one or more surfaces that can receive or engage an input object, which may or may not include direct physical contact, for purposes of allowing movements from the input object to be detected and processed.

As noted earlier, current optical trackpads are typically unable to detect rotational movement of a finger or other object that has been placed on them. At best, a circular movement of a person's finger on the trackpad will generate rigid vertical and horizontal movements of corresponding user interface elements. An optical trackpad module and method for using the same that overcomes these disadvantages is presented herein.

In one arrangement, the optical trackpad module can include a light source that can generate light and a trackpad that can be optically coupled to the light source such that light from the light source can reach the trackpad. The trackpad can be configured to receive an input object, such as a finger. The module can also include a sensor array that can receive at least some of the light from the light source that is reflected off the input object. The sensor array can be divided into sub-sections, and each sub-section can correspond to a portion of the trackpad. In addition, each sub-section can be configured to detect at least translational movement of the input object on the corresponding trackpad portions to enable rotational motion of the input object on the trackpad to be detected.

Referring to FIG. 1, an example of a mobile device 100 having an optical trackpad module 110 is shown. In one arrangement, the mobile device 100 can include a display 115 and a keypad 120. The keypad 120 can include a keyfield having alphanumeric keys arranged in a keyboard layout, numeric keys, and other function keys. It is understood, however, that the keypad 120 can alternatively be a touch keypad that can be shown on the display 115 for touch-screen entry. The mobile device 100 can include a front surface 125 and a side surface 130 in which the side surface 130 can be substantially perpendicular to the front surface 125. As can be seen in this example, the front surface 125 can include the display 115 and the keypad 120, although these components may be positioned on other surfaces of the mobile device 100, if so desired. While in the illustrated embodiment the mobile device 100 is a handheld wireless communication device, the mobile device 100 can be any of the following: a personal digital assistant (PDA), a handheld electronic device, a non-handheld wireless communication device, a pager, a cellular phone, a cellular smart-phone, a wireless organizer, a wirelessly enabled notebook computer and the like.

The optical trackpad module 110 can include a trackpad 135, which can have an outer surface 140. In one arrangement, the outer surface 140 of the trackpad 135 can be positioned on the front surface 125 of the mobile device 100. In an alternative arrangement, the outer surface 140 of the trackpad 135 can be positioned on the side surface 130. Of course, the outer surface 140 of the trackpad 135 can be positioned at other suitable locations on the mobile device 100. In one particular example, the outer surface 140 can be substantially planar or flat. The outer surface 140, however, can have other suitable shapes.

Figure 2:
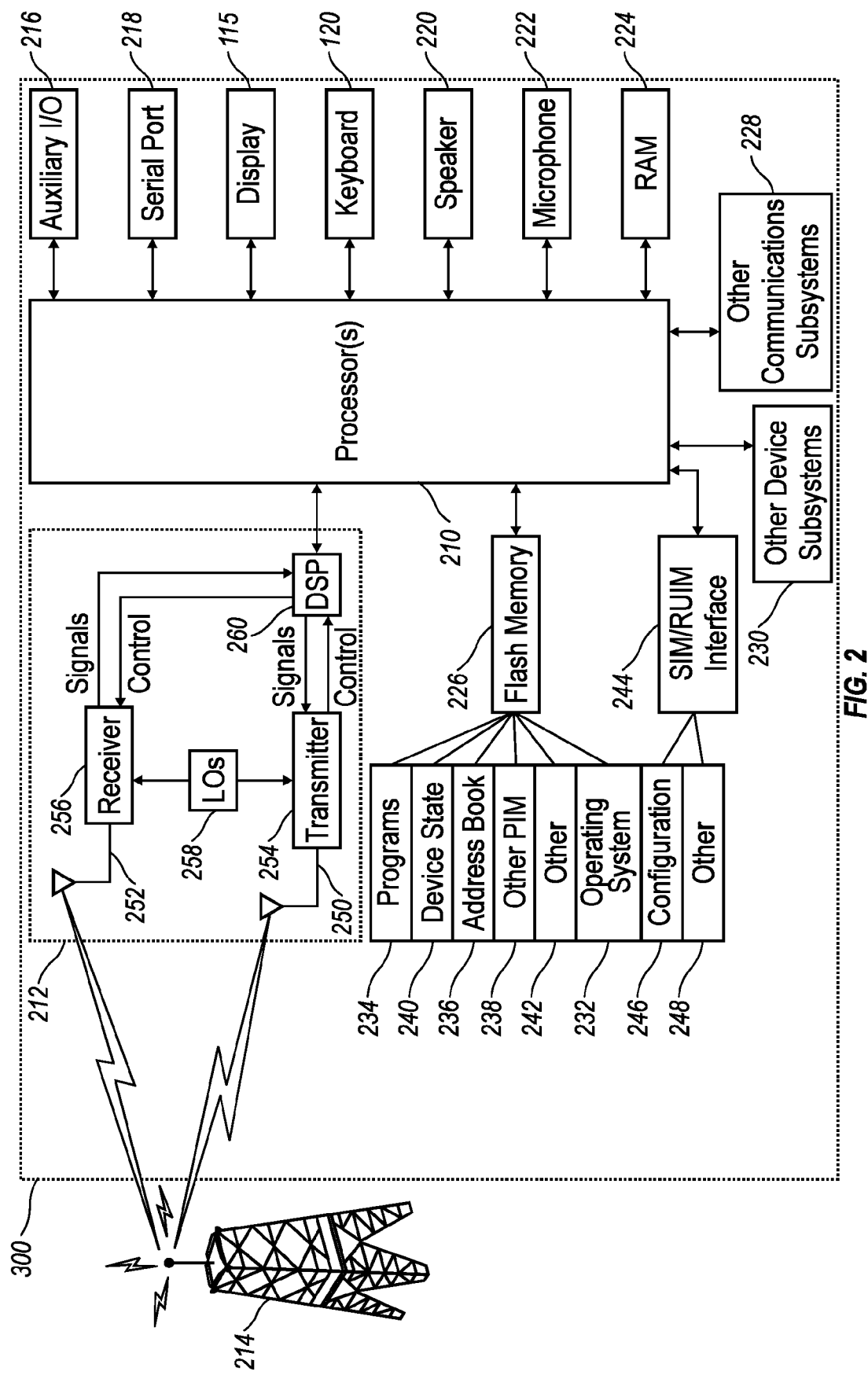
FIG. 2 illustrates a block diagram of an exemplary mobile device.

Referring to FIG. 2, an example of a block diagram of the mobile device 100 is shown. The mobile device 100 can include a processor 210 that can control the operation of the mobile device 100. A communication subsystem 212 can perform all communication transmission and reception with a wireless network 214. The processor 210 can further be coupled to an auxiliary input/output (I/O) subsystem 216, which can be coupled to the mobile device 100. In at least one embodiment, the processor 210 can be coupled to a serial port (for example, a Universal Serial Bus port) 218, which can allow for communication with other devices or systems. The display 115 can be coupled to the processor 210 to allow for displaying of information to an operator of the mobile device 100. When the mobile device 100 is equipped with the keypad 120, the keypad 120 can also be coupled to the processor 210.

The mobile device 100 can include a speaker 220, a microphone 222, random access memory (RAM) 224 and flash memory 226, all of which can be coupled to the processor 210. Other similar components can be provided on the mobile device 100 and optionally coupled to the processor 210. Other communication subsystems 228 and other communication device subsystems 230 are generally indicated as being functionally coupled with the processor 210, as well. An example of a communication subsystem 228 is that of a short range communication system such as BLUETOOTH® communication module or a WI-FI® communication module (a communication module in compliance with IEEE 802.11 set of protocols) and associated circuits and components.

The processor 210 is able to perform operating system functions and can enable execution of programs on the mobile device 100. In some embodiments, not all of the above components may be included in the mobile device 100. For example, in at least one embodiment, the keypad 120 is not provided as a separate component and is displayed as required on a dynamic touch display (not shown). In an embodiment having a dynamic touch display, the keypad 120 can be displayed as a touchscreen keypad. A touchscreen module (not shown) can be incorporated in such an embodiment such that it is in communication with the processor 210. When inputs are received on the touchscreen keypad, the touchscreen module can send or relay messages corresponding to those inputs to the processor 210.

The auxiliary I/O subsystem 216 can take the form of a navigation tool, such as the optical trackpad module 110 illustrated in FIG. 1, or a thumbwheel, a mechanical trackball, a joystick, a touch-sensitive interface, or some other I/O interface. Other auxiliary I/O subsystems can include external display devices and externally connected keyboards (not shown). While the above examples have been provided in relation to the auxiliary I/O subsystem 216, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 can be equipped with components to enable operation of various programs, as shown in FIG. 2. In an exemplary embodiment, the flash memory 226 can be enabled to provide a storage location for an operating system 232, device programs 234 and data. The operating system 232 can generally be configured to manage other programs 234 that are also stored in flash memory 226 and executable on the processor 210. The operating system 232 can honor requests for services made by programs 234 through predefined program 234 interfaces. More specifically, the operating system 232 can typically determine the order in which multiple programs 234 are executed on the processor 210 and the execution time allotted for each program 234, manage the sharing of flash memory 226 among multiple programs 234, handle input and output to and from other device subsystems 230, and so on. In addition, operators can typically interact directly with the operating system 232 through a user interface, which can include the display 115 and the keypad 120. While in an exemplary embodiment, the operating system 232 is stored in flash memory 226, the operating system 232 in other embodiments is stored in read-only memory (ROM) or a similar storage element (not shown). As those skilled in the art will appreciate, the operating system 232, the device program 234 or parts thereof can be loaded in RAM 224 or some other volatile memory.

In one exemplary embodiment, the flash memory 226 can contain programs 234 for execution on the mobile device 100 including an address book 236, a personal information manager (PIM) 238 and the device state 240. Furthermore, programs 234 and other information 242 including data can be segregated upon storage in the flash memory 226 of the mobile device 100.

When the mobile device 100 is enabled for two-way communication within the wireless communication network 214, it can send and receive messages from a mobile communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX) networks, Long Term Evolution (LTE) networks and other networks that can be used for data and voice, or just data or voice.

For the systems listed above, the mobile device 100 can require a unique identifier to enable the mobile device 100 to transmit and receive messages from the communication network 214. Other systems may not require such identifying information. As an example, GPRS, UMTS, and EDGE use a Subscriber Identity Module (SIM) in order to allow communication with the communication network 214. Likewise, most CDMA systems use a Removable User Identity Module (RUIM) to communicate with the CDMA network. The RUIM and SIM card can be used in multiple different mobile devices 100. The mobile device 100 can be able to operate some features without a SIM/RUIM card. A SIM/RUIM interface 244 located within the mobile device 100 can allow for removal or insertion of a SIM/RUIM card (not shown). The SIM/RUIM card can feature memory and can hold key configurations 246, and other information 248, such as identification and subscriber related information. With a properly enabled mobile device 100, two-way communication between the mobile device 100 and communication network 214 is possible.

The two-way communication enabled mobile device 100 can both transmit and receive information from the communication network 214. The transfer of communication can be from the mobile device 100 or to the mobile device 100. To communicate with the communication network 214, the mobile device 100 in the presently described exemplary embodiment is equipped with an integral or internal antenna 250 for transmitting messages to the communication network 214. Likewise, the mobile device 100 in the presently described exemplary embodiment can be equipped with another antenna 252 for receiving communication from the communication network 214. These antennae (250, 252), in another exemplary embodiment, can be combined into a single antenna (not shown). As one skilled in the art would appreciate, the antenna or antennae (250, 252) in another embodiment can be externally mounted on the mobile device 100. The mobile device 100 can also have a transmitter 254 and a receiver 256, which can be respectively coupled to antennae (250, 252), and can also include one or more local oscillators 258 for processing the incoming or outgoing RF signals. The mobile device 100 can also have a digital signal processor (DSP) 260 to assist in the processing of the incoming and outgoing signals.

Figure 3:
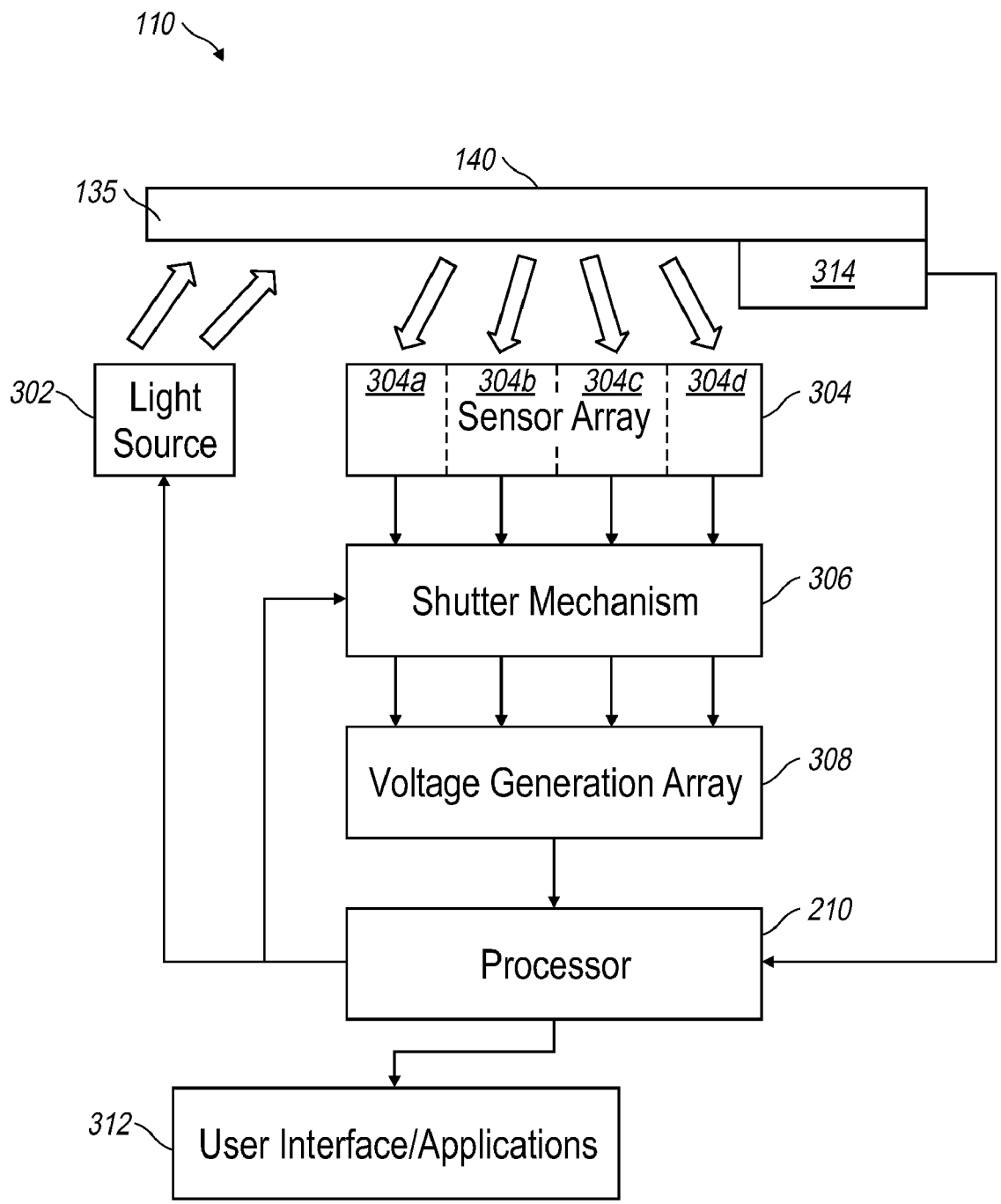
FIG. 3 illustrates a block diagram of an exemplary optical track module.

Referring to FIG. 3, an example of a block diagram of the optical trackpad module 110 is shown that can be incorporated in the mobile device 100 of FIGS. 1 and 2. The module 110 can include the trackpad 135 and the outer surface 140, which is described above. In addition, the module 110 can include a light source 302, which can be optically coupled to the trackpad 135, and can include a sensor array 304. The term "optically coupled" is defined as any connection that allows light to reach a target, which includes using only air as the medium or some physical channel, like a light guide, or a combination of both. The light source 302 can emit light, and the light can reach the trackpad 135 and can be reflected off an input object (not shown). At least some of the light reflected off the input object can be received at the sensor array 304. In one arrangement, the light source 302 can generate light that is outside the visible spectrum, although it is understood that light of visible wavelengths may be used here. One example of non-visible light that can be generated by the light source 302 is infrared light.

As an example, the sensor array 304 can be divided into sub-sections 304a, 304b, 304c and 304d. As will be explained below, each of these sub-sections 304a-d can correspond to one or more portions of the trackpad 135. Each of these sub-sections 304a-d can also be configured to receive the light that is reflected from the input object. Although four sub-sections 304a-d are illustrated here, it must be noted that the sensor array 304 can have any suitable number of sub-sections. The sub-sections 304a-d can convert the received reflected light into electrical signals, which can be fed to a shutter mechanism 306. The amplitude of these signals can be proportional to the amount of reflected light that is received at the sub-sections 304a-d; for example, more received light can equal a higher amplitude.

The shutter mechanism 306 can be coupled to a voltage generation array 308. These two components can work together to generate voltages that are proportional to the amount of light received at the sub-sections 304a-d of the sensor array 304. In one arrangement, the shutter mechanism 306 can be an electrical component with no moving parts, if desired. For example, the shutter mechanism 306 can repeatedly switch between an open electrical state and a closed electrical state to selectively permit electrical signals from the sensor array 304 to reach the voltage generation array 308. That is, when the shutter mechanism 306 is in an open state, the signals from the sensor array 304 can enter the voltage generation array 308, where charges that are associated with the signal amplitudes can accumulate. When the shutter mechanism 306 enters a closed state, however, the signals from the sensor array 304 can be prevented from reaching the voltage generation array 308, which can block further charge accumulation in that component. In one arrangement, the voltage generation array 308 can be a collection of sense capacitors, although the array 308 can take the form of any other suitable components.

The voltage generation array 308 can multiplex and amplify the generated voltages and can convert them to digital values. These digital values can then be fed to the processor 210. As will be explained below, the processor 210 can compare these values and can detect certain types of movement from the input object. Following this comparison, the processor 210 can signal a user interface/applications module 312 (which can be part of the device programs 234), thereby causing certain corresponding actions to take place. Several examples of this process will be described later. The processor 210 can also control the operation of the light source 302 and the shutter mechanism 306. For example, the processor 210 can signal the light source 302 to emit light on a periodic—as opposed to continuous—basis in an effort to reduce power consumption. As another example, the processor 210 can signal the shutter mechanism 306 to increase or decrease its frame rate (the rate it moves between open and closed states) to maintain a balance between better detection of the type of movement of the input object and power conservation.

The optical trackpad module 110 can also include a depression detection component 314, which can be positioned underneath the trackpad 135. The depression detection component 314 can detect a depression movement from the input object, such as when a pushing force is applied to the trackpad 135. The detection component 314 can be coupled to the processor 210 and can signal the processor 210 when the detection component 314 detects the depression movement. The processor 210 can then take any suitable type of action in response to this signaling. An example of such action will be described below.

Figure 4:
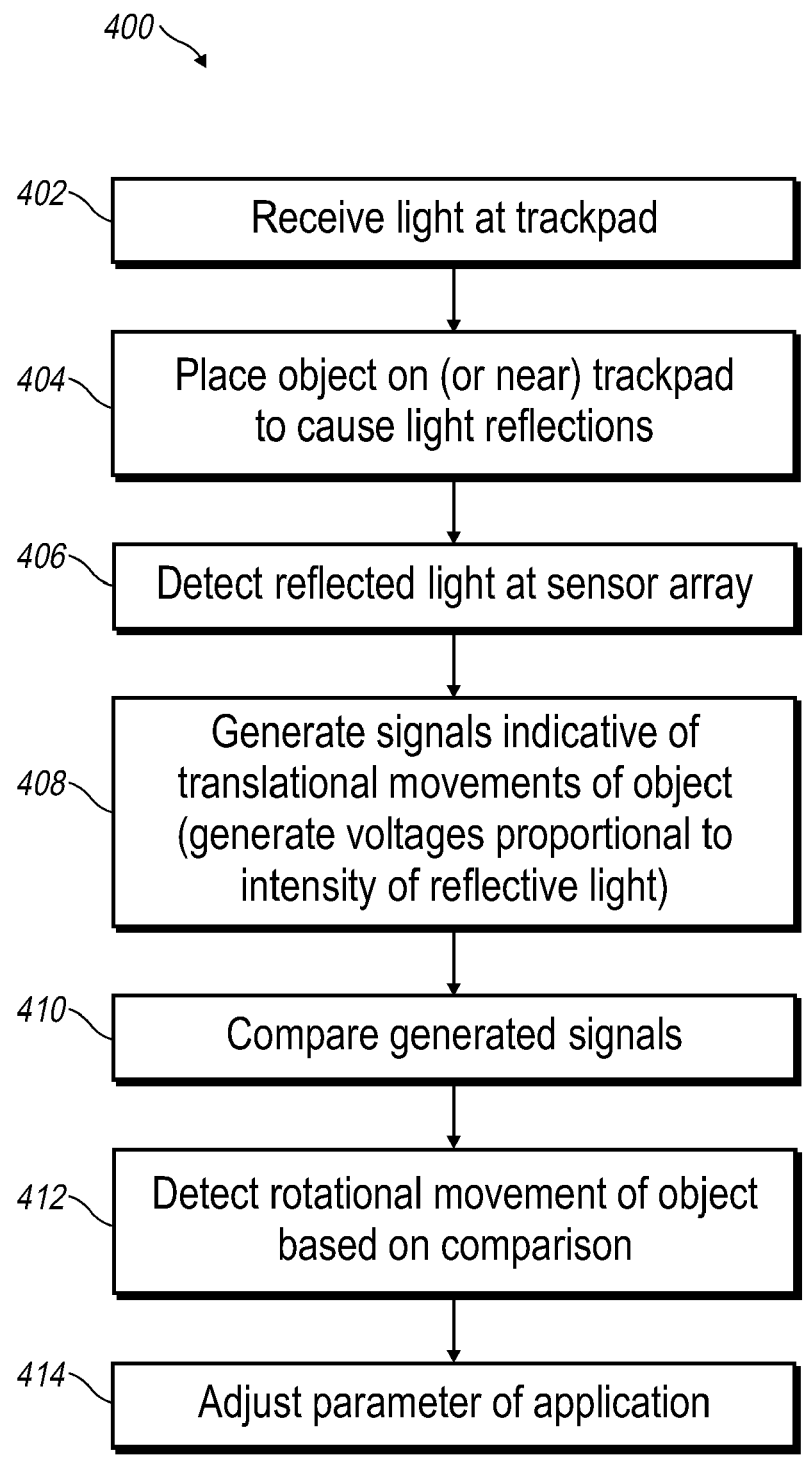
FIG. 4 illustrates an exemplary method of detecting rotational movement of an object.
Figure 5:
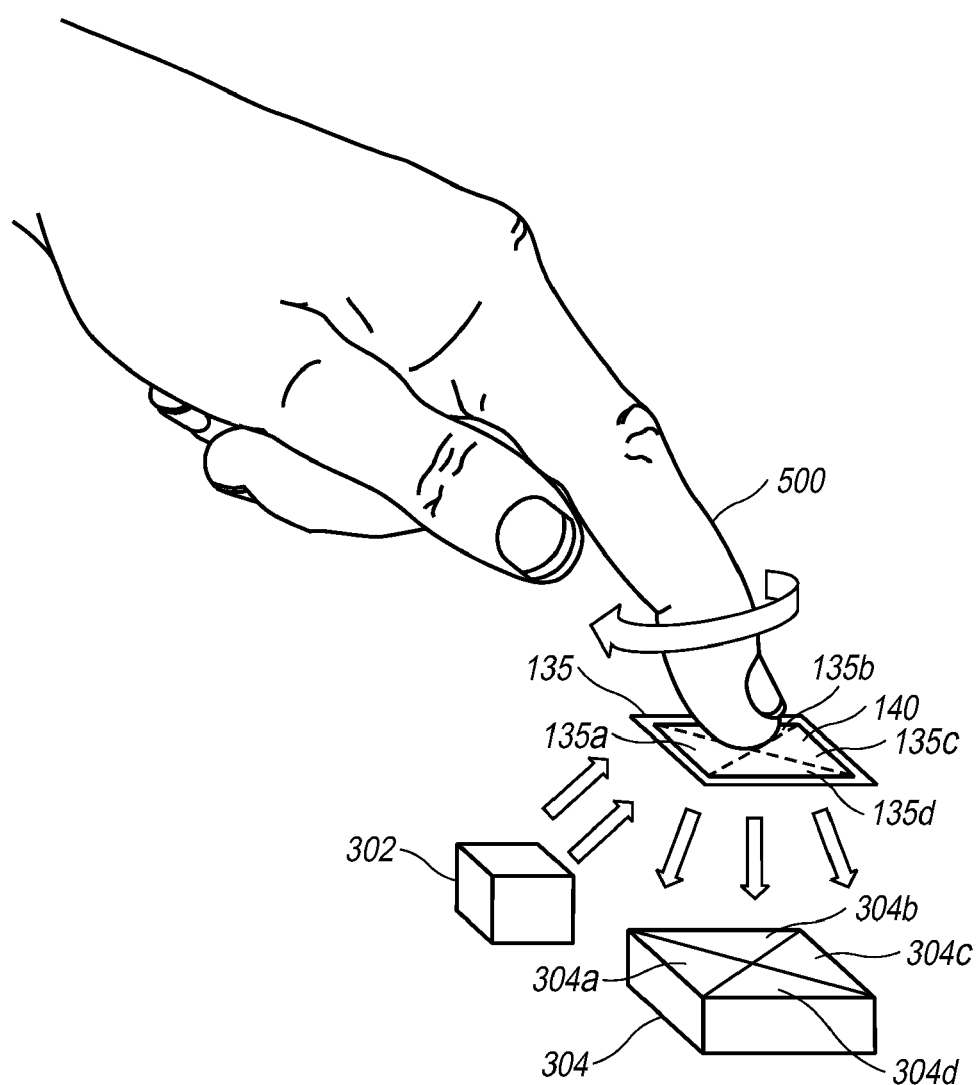
FIG. 5 illustrates an example of an input object positioned on a trackpad.
Figure 5:
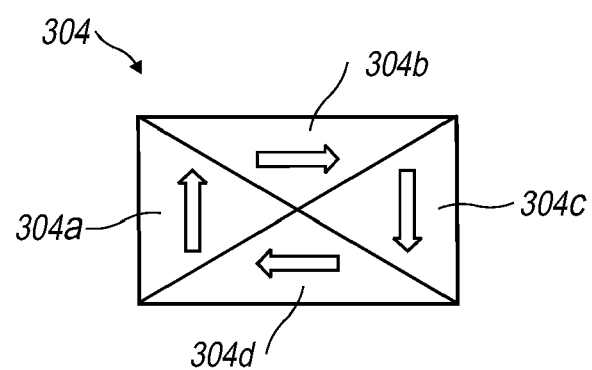
Figure 6:
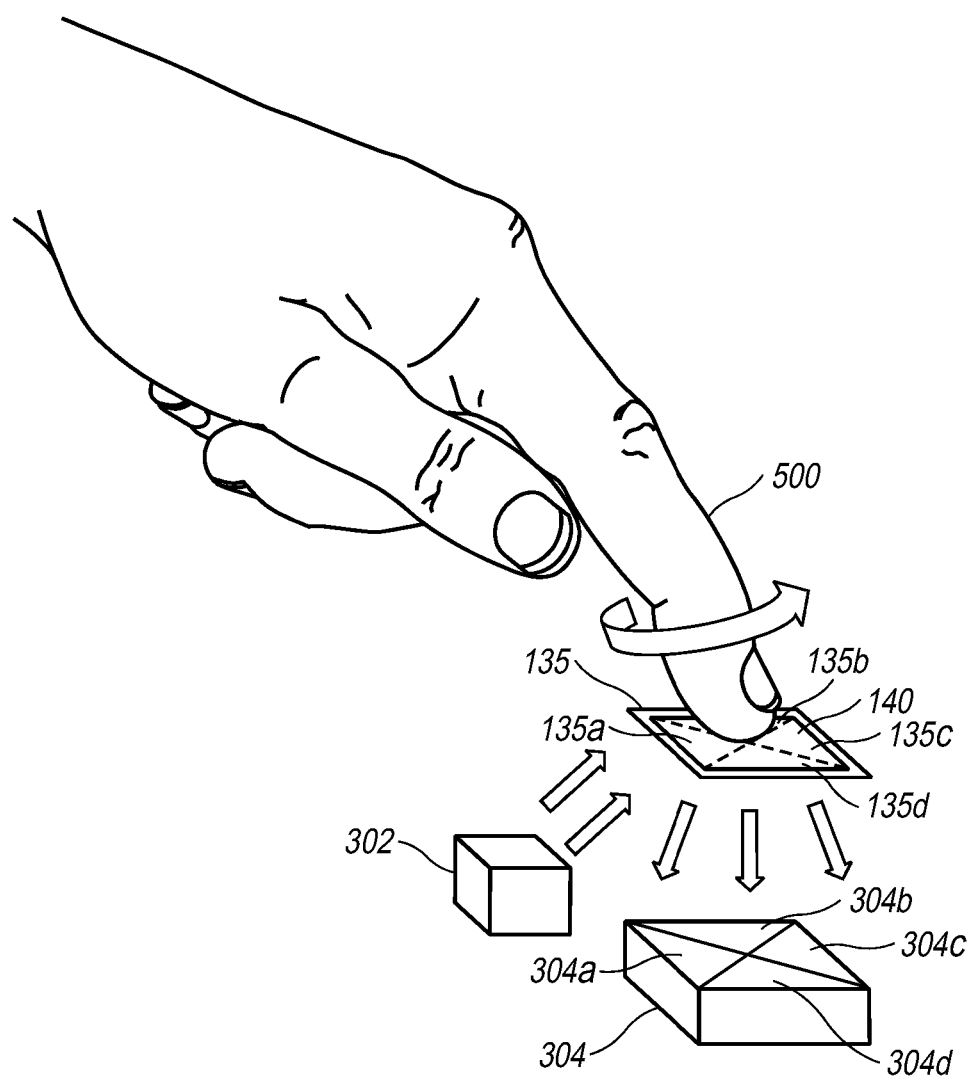
FIG. 6 illustrates another example of an input object on a trackpad.
Figure 6:
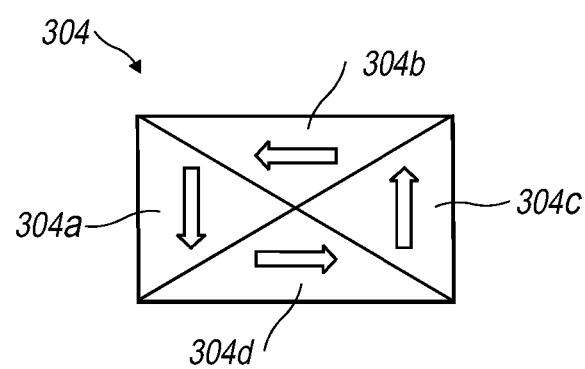

Referring to FIG. 4, an example of a method 400 of detecting rotational movement of an object is shown. When describing this method 400, reference can be made to the components illustrated in FIGS. 1 and 3, although it is understood that the method 400 can be practiced with any other suitable system. Reference will also be made to FIGS. 5 and 6, which show examples of an input object interacting with an optical trackpad module. It must be noted that the method 400 is not necessarily limited to the method as illustrated, as the method 400 can contain a greater or fewer number of steps in comparison to what is pictured. The method 400 is not necessarily limited to the particular ordering shown here, either.

At step 402, light can be received at a trackpad, and an object can be placed on or near an outer surface of the trackpad to cause light reflections, as shown at step 404. In addition, at step 406, light that is reflected off the object can be detected at a sensor array, which can contain several subsections. Signals that are indicative of multiple translational movements of the object can be generated as the object moves on the outer surface of the trackpad in relation to the subsections, as shown at step 408. As part of this step, based on signals from the sensor array, voltages that are proportional to the intensity of the light reflected off the object can be generated. At step 410, the generated signals can be compared, and at step 412, rotational movement of the object can be detected based on the comparison of the generated signals. At step 414, a parameter of an application can be adjusted based on the detected rotational movement.

An example of this process will now be presented. Referring back to FIGS. 1 and 3, the light source 302 can emit light, which can be received at the trackpad 135. An input object (not shown), such as a user's finger, can be received by the trackpad 135. As an example, the input object can be physically placed or positioned on the outer surface 140 of the trackpad 135 for purposes of entering commands through the optical trackpad module 110. As another example of the trackpad 135 receiving the input object, the input object can be positioned above and near the outer surface 140 such that the object is not touching the outer surface 140 but can still cause corresponding actions to be performed on the mobile device 100.

Referring to FIG. 5, an example of an input object 500 positioned on the outer surface 140 of the trackpad 135 is shown. In this example, the input object 500 is a user's finger. Light from the light source 302 can reflect off the user's finger and can be received at the sensor array 304. The arrows from the light source 302 and from the trackpad 135 can represent this light. The sub-sections 304a-d can receive the reflected light. Here, the user's finger can be moved in a clockwise motion, as depicted by the arrow.

Each of the sub-sections 304a-d can correspond to a portion 135a-d of the trackpad 135 such that rotational motion of the user's finger can cause translational movements to be detected in one or more of the sub-sections 304a-d. A "translational movement" is defined as a movement that is substantially parallel over a certain distance. An example of this process is shown in FIG. 5. A top view of the sensor array 304 is illustrated in which arrows representing exemplary detected translational movements can be seen. That is, the rotational motion of the input object 500 on the trackpad 135 can cause certain translational movements to be detected in the sub-sections 304a-d. The processor 210 can compare these detected translational movements and based on this comparison, the processor 210 can detect the rotational motion of the input object 500 and the direction of this movement. The term "rotational motion" is defined as an act of moving an object around an axis and includes substantially circular movements or discrete translational movements that when combined simulate a substantially circular movement.

Based on the operation of the shutter mechanism 306, the processor 210 can detect slight changes in the translational movements over time. Also as part of the comparison, the processor 210 can detect translational movements on the input object 500 that are opposite to one another. For example, the processor 210 can determine that the translational movements detected in sub-sections 304a and 304c are in substantially opposite directions, in addition to those of sub-sections 304b and 304d. Moreover, the processor 210 can also determine the direction of rotation, which in this example is substantially clockwise.

Referring to FIG. 6, an example of the input object 500 being rotated in a counter-clockwise (CCW) motion is shown. Here, the rotational motion of the object 500 on the trackpad 135 can lead to translational movements being detected in the sub-sections 304a-d of the sensor array 304, similar to the process described above in relation to FIG. 5. In this example, however, the translational movements detected in the sub-sections 304a-d are in directions that are substantially opposite to those of the example described above, in view of the CCW motion. As described earlier, the processor 210 can detect the rotational motion and determine its direction, in this case, CCW.

As can be seen in either FIG. 5 or 6, the sensor array 304 can include a number of sub-sections 304a-d, which can correspond to portions 135a-d of the trackpad 135. For example, sub-section 304a can correspond to track portion 135a, while sub-section 304b can correspond to portion 135b and so on. In these examples, the sub-sections 304a-d can be essentially aligned with the corresponding portions 135a-d of the trackpad. As such, the number of sub-sections 304a-d of the sensor array 304 can be equal to the number of corresponding portions 135a-d of the trackpad 135. As a specific example, the optical trackpad module 110 can include four sub-sections 304a-d and four corresponding portions 135a-d. It must be understood, however, that the optical trackpad module 110 can include any suitable number of sub-sections and any suitable number of trackpad portions, and the number of these components need not be equal. For example, one sub-section of the sensor array 304 can be responsible for detecting movements in two or more corresponding portions of the trackpad 135.

Figure 7:
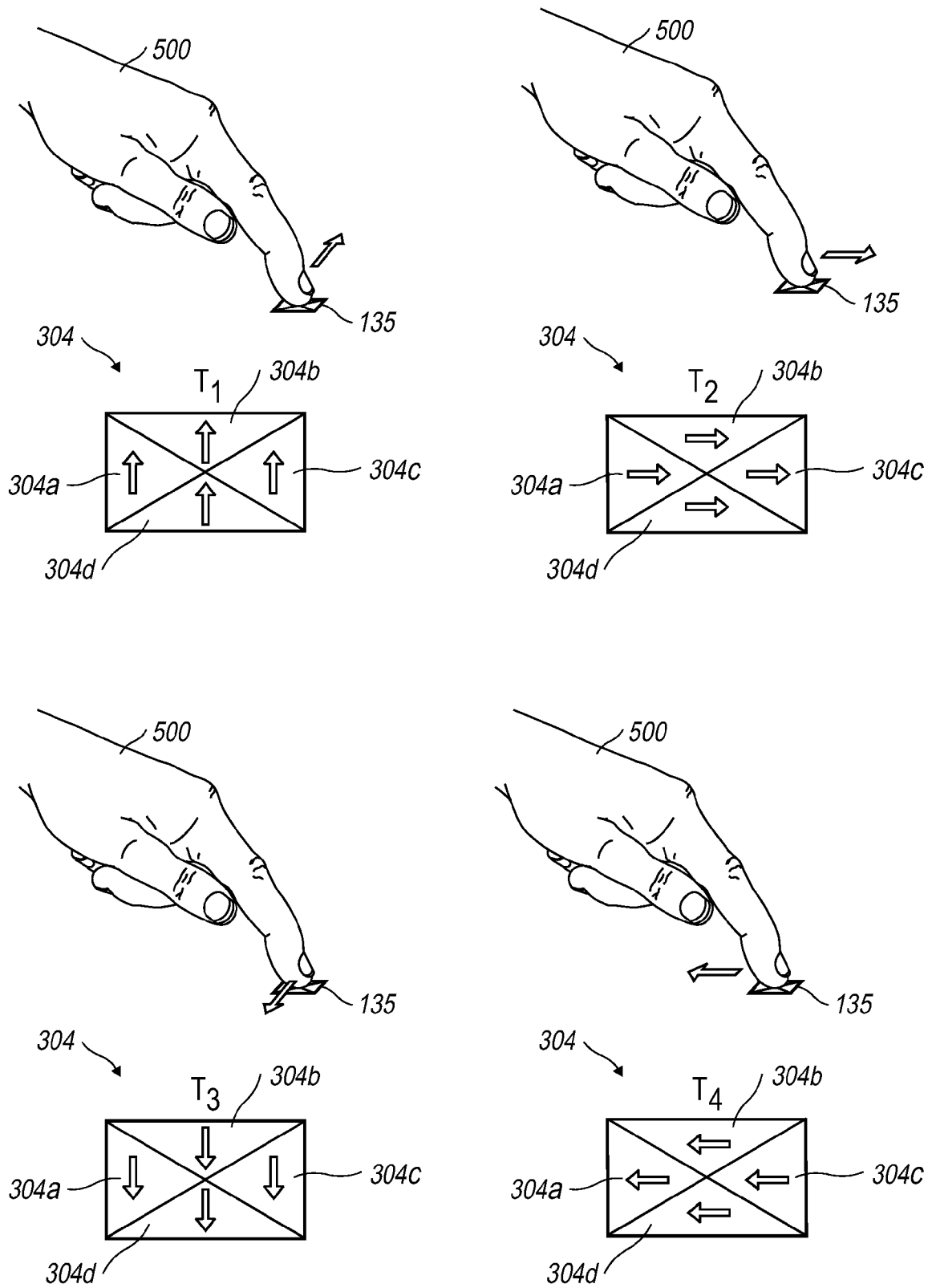
FIG. 7 illustrates examples of motion detected on a sensor array.

Referring to FIG. 7, another example of how rotational motion can be detected at the trackpad 135 will be presented. Similar to FIGS. 5 and 6, a top view of the sensor array 304 with the sub-sections 304a-d is shown here, although four such views are part of this drawing. Each of the top views of the sensor array 304 displays arrows that represent translational movement of an input object over the trackpad portions 135a-d corresponding to the sub-sections 304a-d. As an example, the input object 500 can be the operator's finger shown in FIGS. 5 and 6. For each top view, the corresponding motion by the input object 500 (user finger) that can generate the arrows on the sub-sections 304a-d is positioned next to the relevant top views.

Each top view of the sensor array 304 has a relevant time stamp presented above, $T_1$, $T_2$, $T_3$ and $T_4$. These time stamps can represent sequential periods of time in which a certain type of translational movement is detected on the trackpad 135 at a particular time. For example, at time $T_1$, the operator can move his finger in a translational manner in an up direction (towards the display 115 of FIG. 1) over the trackpad portions 135a-d. A short time later at time $T_2$, the operator can move his finger towards the right, followed by a subsequent downward translational movement at time $T_3$. Finally, the operator can move his finger across the trackpad portions 135a-d towards the left at subsequent time $T_4$. The processor 210 can sequentially detect this series of translational movements over the trackpad 135 over the period of time (times $T_1$-$T_4$) to determine that the operator wishes to initiate some action that is associated with a rotational motion. That is, the distinct and sequential translational movements described above can be recognized as a rotational motion, and a subsequent action that is associated with such rotational motion can be executed. As such, rotational movement or motion of an input object in the context of this subject matter includes both a substantially circular movement of that object and a series of translational movements that combine to form a substantially circular movement of the object.

Because rotational motion can be detected at the trackpad 135, the optical trackpad module 110 can serve as a user interface for various controls. For example, referring to FIGS. 1, 3, 5, 6 and 7, if the mobile device 100 is equipped with a media application and a camera application (both of which can be part of the user interface/applications module 312), the trackpad module 110 can be used to adjust parameters of these applications based on detected rotational movement of the input object 500. A media application can be any combination of hardware and software that can be used to play media files, such as MP3 or MPEG files. In such an arrangement, a user of the mobile device 100 may rotate his finger to adjust the volume of a media file or to control the playback of such a file, for example. The processor 210 can signal the appropriate components once it detects the relevant rotational motion. Additionally, because the optical trackpad module 110 includes a depression detection component 314, the user can also enter commands by pressing down on the trackpad 135. For example, the user may press down on the trackpad 135 to enter a "pause" command for a media file.

As another example, the user may rotate his finger to control a function of a camera application. A camera application can be any combination of hardware and software that can be used to operate a camera or some other imaging device. In particular, a user can rotate his finger to control a zoom feature of the camera application. In addition, the user can depress the trackpad 135 to cause an image to be captured by the camera application. Once it detects the rotational motion or pressing force, the processor 210 can signal the appropriate components to take the relevant action associated with the detected movement or force.

Although several examples concerning the use of media or camera applications have been described, it is understood that the optical trackpad module 110 can provide a user interface aspect to numerous other applications or components. Furthermore, in view of this arrangement, buttons or keys that have been separately dedicated to operation of applications on the mobile device 100 can be eliminated, resulting in less space requirements and lower expenses. For example, side buttons that would normally be positioned on the mobile device 100 may no longer necessary, and by removing them, less space is needed on the printed circuit board for volume control.

Portions of the mobile device 100 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Examples have been described above regarding an optical trackpad module and method of using same. Various modifications to and departures from the disclosed embodiments will occur to those having skill in the art. The subject matter that is intended to be within the spirit of this disclosure is set forth in the following claims.

What is claimed is:

1. An electronic device, comprising:
   an optical trackpad module that is configured to generate a navigation signal, the optical trackpad module comprising:
   a light source that emits light;
   a trackpad that is optically coupled to the light source, the trackpad being configured to detect an input object; and
   a sensor array that receives at least a portion of the light emitted from the light source that is reflected off the input object, the sensor array being divided into sub-sections, each sub-section corresponding to a portion of the trackpad, each sub-section detecting at least translational movements of the input object on the corresponding trackpad portions to enable detection of rotational motion of the input object on or above the trackpad: and
   a processing unit that receives the navigation signal, the processing unit being operable to determine a direction of the rotational motion of the input object based on the detected translational movements of the input object on the corresponding trackpad portions, the translational movements of the input object having directions that are opposite to one another.

2. The electronic device according to claim 1, wherein the processing unit is alternatively operable to sequentially detect a series of translations over the trackpad portions over a period of time to enable the rotational motion to be determined.

3. The electronic device according to claim 1, further comprising a shutter mechanism that is coupled to the sensor array and is configured to selectively permit signals from the sensor array to generate voltages that are proportional to an intensity of the light reflected off the input object.

4. The electronic device according to claim 1, further comprising a depression detection component that is positioned underneath the trackpad and that is configured to detect a depression movement from the input object.

5. The electronic device according to claim 1, wherein the trackpad acts as one of a volume control and a playback control during a media mode.

6. The electronic device according to claim 1, the electronic device having a front surface and a side surface that is perpendicular to the front surface, wherein the front surface includes a display and wherein the trackpad is positioned on one of the front surface and the side surface of the electronic device.

7. The electronic device according to claim 1, wherein the light source generates light outside a visible spectrum.

8. The electronic device according to claim 1, wherein the number of sub-sections is equal to the number of corresponding portions of the trackpad.

9. An electronic device, comprising:
a display;
an optical trackpad module that is configured to generate a navigation signal, the optical trackpad module comprising:
  a light source that emits light;
  a trackpad that is positioned to receive non-visible light from the light source, wherein the trackpad includes an outer surface that detects an input object;
  a sensor array that is positioned to receive non-visible light emitted from the light source that is reflected off the input object when the input object is placed on the outer surface of the trackpad, the sensor array being divided into sub-sections, each sub-section corresponding to a portion of the trackpad, each sub-section is configured to detect at least translational movements of the input object on the corresponding trackpad portions to enable detection of rotational motion of the input object on or above the trackpad;
  a depression detection component operable to detect depression movement of the input object on the trackpad; and
a processor operable to receive the navigation signal, the processor coupled to the depression detection component and operable to determine a direction of the rotational motion of the input object based on the detected translational movements of the input object on the corresponding trackpad portions, the translational movements of the input object having directions that are opposite to one another.

10. The electronic device according to claim 9, wherein the electronic device operates in one of a media mode and a camera mode and the processor is operable to control one of a volume and a playback of a media application in the media mode and to control a zoom of a camera application in the camera mode based on the processor determining that the input object is moving in the substantially rotational manner.

11. The electronic device according to claim 10, the electronic device having both a front surface and a side surface, wherein the side surface is substantially perpendicular to the front surface and wherein the outer surface of the trackpad is positioned on one of the front surface and the side surface.

12. The electronic device according to claim 9, wherein the translational movements are sequentially detected over a period of time.

13. A method, comprising:
receiving light at a trackpad, the trackpad including an outer surface;
placing an object on or near the outer surface of the trackpad, thereby causing light received at the trackpad to be reflected off the object;
detecting the light reflected off the object at a sensor array that contains at least one sub-section;
generating signals that are indicative of multiple translational movements of the object as the object moves on or above the outer surface of the trackpad in relation to the at least one sub-section; and
based on the generated signals, detecting directions of translational movement of the object that are opposite to one another; and
based on the detected directions of translational movement, detecting a direction of rotational movement of the object.

14. The method according to claim 13, further comprising adjusting a parameter of an application based on the detected direction of rotational movement.

15. The method according to claim 14, wherein the application is a media program and the parameter is one of a volume and a selective playback of the media program.

16. The method according to claim 13, further comprising generating voltages that are proportional to an intensity of the light reflected off the object based on the generated signals.

17. The method according to claim 13, wherein the light received at the trackpad is outside a visible light spectrum.

18. The electronic device according to claim 1, wherein the trackpad performs a zoom control during a camera mode.

19. The method according to claim 14, wherein the application is a camera program and the parameter is a zoom feature of the camera program.

* * * * *